US00RE50798E

(19) United States
(12) Reissued Patent
Hong et al.

(10) Patent Number: US RE50,798 E
(45) Date of Reissued Patent: Feb. 17, 2026

(54) RECLINING DEVICE FOR SEAT

(71) Applicants: HYUNDAI MOTOR COMPANY, Seoul (KR); KIA CORPORATION, Seoul (KR); DAECHANG SEAT CO., LTD-DONGTAN, Hwaseong-si (KR)

(72) Inventors: Suk Won Hong, Bucheon-si (KR); Jong Seok Han, Suwon-si (KR); Jun Yong Kim, Seoul (KR); Sang Do Park, Suwon-si (KR); Sang Man Seo, Suwon-si (KR); Sung Hak Hong, Suwon-si (KR); Myung Soo Lee, Osan-si (KR); In Chang Hwang, Ulsan (KR); Kyoung Min Cho, Hwaseong-si (KR)

(73) Assignees: HYUNDAI MOTOR COMPANY, Seoul (KR); KIA CORPORATION, Seoul (KR); DAECHANG SEAT CO., LTD-DONGTAN, Hwaseong-si (KR)

(21) Appl. No.: 18/380,995

(22) Filed: Oct. 17, 2023

Related U.S. Patent Documents

Reissue of:
(64) Patent No.: 11,505,096
Issued: Nov. 22, 2022
Appl. No.: 17/333,501
Filed: May 28, 2021

(30) Foreign Application Priority Data

Oct. 14, 2020 (KR) ..... 10-2020-0132641

(51) Int. Cl.
*B60N 2/23* (2006.01)
*B60N 2/02* (2006.01)
*B60N 2/22* (2006.01)

(52) U.S. Cl.
CPC ..... *B60N 2/2245* (2013.01); *B60N 2/02253* (2023.08); *B60N 2/02258* (2023.08); *B60N 2/0228* (2013.01); *B60N 2/233* (2013.01)

(58) Field of Classification Search
CPC ..... B60N 2/2245; B60N 2/02253; B60N 2/02258; B60N 2/0228; B60N 2/206; B60N 2/233
See application file for complete search history.

(56) References Cited

U.S. PATENT DOCUMENTS 7,819,478 B2 * 10/2010 Griswold ..... B60N 2/2245 297/378.12
2005/0062327 A1 3/2005 Griswold et al.
(Continued)

FOREIGN PATENT DOCUMENTS

CN 204161157 U 2/2015
CN 204184217 U 3/2015
(Continued)

OTHER PUBLICATIONS

English translation of DE-102005004747-A1 retrieved from EPO's Espacenet website.*
(Continued)

*Primary Examiner* — Peter C English
(74) *Attorney, Agent, or Firm* — MCDONNELL BOEHNEN HULBERT & BERGHOFF LLP

(57) ABSTRACT

The present disclosure relates to a reclining device for a seat, which can adjust a seatback at various angles through movement of a striker installed in a vehicle body. The reclining device for a seat includes a latch installed on a side of a seatback and configured to be rotated together with the seatback, and a striker module in which the latch is engaged with a striker installed in a vehicle body, where the striker moves in a certain section overlapping a rotation trajectory of the latch in a state where the latch is engaged and reclines the seatback together with the latch.

7 Claims, 10 Drawing Sheets

(56) References Cited

U.S. PATENT DOCUMENTS

| | | | | |
|---|---|---|---|---|
| 2008/0129017 | A1* | 6/2008 | Okazaki | B60N 2/366 280/727 |
| 2009/0021067 | A1 | 1/2009 | Griswold et al. | |
| 2011/0175420 | A1* | 7/2011 | Bruck | B60N 2/2245 297/363 |
| 2011/0187171 | A1* | 8/2011 | Ishii | B60N 2/22 296/65.17 |
| 2011/0233981 | A1* | 9/2011 | Ishii | B60N 2/2245 297/365 |
| 2015/0336478 | A1* | 11/2015 | Mitsuhashi | B60N 2/20 296/65.09 |
| 2018/0056818 | A1 | 3/2018 | Ruan | |
| 2018/0111514 | A1* | 4/2018 | Ruan | B60N 2/02246 |

FOREIGN PATENT DOCUMENTS

| | | | | | |
|---|---|---|---|---|---|
| DE | 19629964 | A1 * | 1/1998 | | B60N 2/0232 |
| DE | 102005004747 | A1 * | 8/2006 | | B60N 2/2245 |
| DE | 102008064523 | A1 * | 7/2009 | | B60N 2/0232 |
| DE | 102010022627 | A1 | 12/2011 | | |
| DE | 102018115095 | A1 * | 12/2019 | | B60N 2/2245 |
| EP | 1055551 | A1 * | 11/2000 | | B60N 2/0232 |
| JP | S63-232046 | A | 9/1988 | | |
| JP | 2003070585 | A | 3/2003 | * | |
| JP | 2010-274690 | A | 12/2010 | | |
| JP | 5402536 | B2 | 1/2014 | | |
| KR | 2004-0033909 | A | 4/2004 | | |

OTHER PUBLICATIONS

English translation of DE-102008064523-A1 retrieved from EPO's Espacenet website.*

English translation of DE-102018115095-A1 retrieved from EPO's Espacenet website.*

English translation of DE-19629964-A1 retrieved from EPO's Espacenet website.*

English translation of EP-1055551-A1 retrieved from EPO's Espacenet website.*

English translation of JP-2003070585-A retrieved from EPO's Espacenet website.*

English translation of CN-204161157-U retrieved from EPO's Espacenet website.*

English translation of CN-204184217-U retrieved from EPO's Espacenet website.*

* cited by examiner

RECLINING DEVICE FOR SEAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[The present] *This* application *is an application for the reissue of U.S. Pat. No. 11,505,096 B2, which issued from application Ser. No. 17/333,501 filed May 28, 2021, which* claims priority of Korean Patent Application No. 10-2020-0132641 filed on Oct. 14, 2020, the entire contents of which is incorporated herein for all purposes by this reference.

BACKGROUND

Field

The present disclosure provides a reclining device for a seat, which can adjust a seatback at various angles through movement of a striker installed in a vehicle body.

Description of the Related Art

A reclining device is a device which functions to adjust a seatback angle by lifting a manual lever, and a mechanism called a recliner core is provided at a lower end thereof and a part, such as a leg bracket, is mounted thereon to support the recliner core.

Such a reclining device has an advantage that it can adjust the angle of the seatback at various angles at intervals of 2°, and thus has been applied to many vehicle models.

However, since all structures are supported by two recliner cores, the reclining device has a weak strength as compared with other seatback adjustment mechanisms, and since many parts are used, the cost and weight of a product are increased.

In order to solve such problems, a 3-point fixing type multistage latch structure has been proposed, in which a vehicle body and a seat are fixed in two places of a bottom hinge and in one place of a top striker.

In this case, the seat and the vehicle body are fixed in several places, and thus the multistage latch structure has an advantage in that it is excellent from the viewpoint of the strength as compared with the reclining device.

However, in case of the multistage latch structure, since the seatback angle is adjusted by making a plurality of mounting grooves on one latch, it is unable to variously adjust a rotation angle of the seatback.

Further, since the multistage latch also adjusts the seatback angle by directly lifting a lever manually as in the existing reclining device, it is uncomfortable to adjust the seatback angle.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is proposed to solve the above-mentioned problems, and provides a reclining device for a seat, which can adjust a seatback at various angles through movement of a striker installed in a vehicle body for [combination] *engagement* with a latch.

In order to achieve the above object, a reclining device for a seat according to the present disclosure may include a latch installed on a side of a seatback and configured to be rotated together with the seatback, and a striker module [in which the latch is engaged with] *having* a striker *and being* installed in a vehicle body, [and] *wherein the striker is engaged by the latch. The latch moves along a rotation trajectory as the seatback reclines, and* the striker *module* moves [in a certain section] *the striker along a striker trajectory* overlapping [a] *the* rotation trajectory of the latch in a state where the latch is engaged [and reclines] *with the striker such that movement of the striker causes* the seatback *to recline* together with the latch.

The striker module may include a lead screw installed on the vehicle body along a linear trajectory on which the striker moves, a moving block [penetratingly combined] *penetrated by and in threaded engagement* with the lead screw [in a screw structure and], *the moving block being* configured to move in a straight line along the lead screw [in a state where] *such that* a rotation motion of the lead screw is converted into a linear motion *of the moving block*, and the striker *is* configured to move together with the moving block.

The reclining device may include a guide bracket [combined] *positioned* between the moving block and the striker; and a guide [wire combined with] *rod secured to* the vehicle body, [penetratingly provided in] *penetrating* the guide bracket in a direction parallel to the lead screw, and configured to guide the straight movement of the moving block.

[An extension part] *Extension parts* may [be formed at both] *extend from respective opposite* ends of the guide bracket *and* in a direction orthogonal to the lead screw, [and] a guide hole may be formed [on] *in each of* the extension [part] *parts,* and the guide [wire may be penetratingly provided in] *rod penetrates* the guide [hole] *holes*.

The reclining device may further include a motor configured to provide a rotational driving force to the lead screw.

A reclining switch may be provided in a vehicle compartment, and the motor may be rotated in a forward or reverse direction in accordance with an operation of the reclining switch.

A module mounting bracket may be [combined with] *secured to* the vehicle body, [a] *bent* support [part] *parts* may [be formed to be bent at both] *extend from respective opposite* ends of the module mounting bracket [toward] *and in a same direction as* the striker, a *respective* sub bracket may be [combined with] *secured to each of* the support [part] *parts*, a main support hole *may be formed in each of the support parts* and a sub support hole may be [coaxially] formed [on the support part and] *in each of* the sub [bracket] *brackets*, [respectively,] the main support hole [and the sub support hole] *in each of the support parts being coaxial with and* being [formed to be] spaced apart from [each other] *the sub support hole in the respective sub bracket*, and the lead screw may [be inserted into] *extend through* and *be* supported by *each of* the main support [hole] *holes* and the sub support [hole] *holes*.

A motor mounting bracket may be combined with the vehicle body and the motor may be mounted thereon, an end part of the motor mounting bracket and an end part of the module mounting bracket may be provided to overlap each other, and border portions and overlapping portions of the motor mounting bracket and the module mounting bracket may be bolting-combined with the vehicle body.

[A] *The latch comprises a* hook portion [in which] *that engages* the striker [is combined with] *to secure the striker to* the latch [may be formed], the hook portion [may be formed in] *defines* a shape of an elongated hole along a normal direction with respect to the rotation trajectory of the latch, and *the seatback reclines together with the latch within* a maximum angle range [of the seatback] *that* may be [determined] *limited* by [configuring] an offset range [in] *within* which the striker [is movable] *moves* along the [hook portion in a state where the movement] *elongated hole as the striker module moves the striker along the striker* trajectory [of the striker and] *overlapping* the rotation trajectory of the latch [are simultaneously satisfied].

The maximum angle range of the seatback may be 10° to 50°.

Through the above-described problem solving means, according to the present disclosure, since the striker moves in accordance with the operation of the motor and the latch is pulled to move in the movement direction of the striker, the seatback combined with the latch moves together, and thus it is possible to recline the seatback at stepless angles.

BRIEF DESCRIPTION OF THE FIGURES

The above and other objects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

Figure 1:
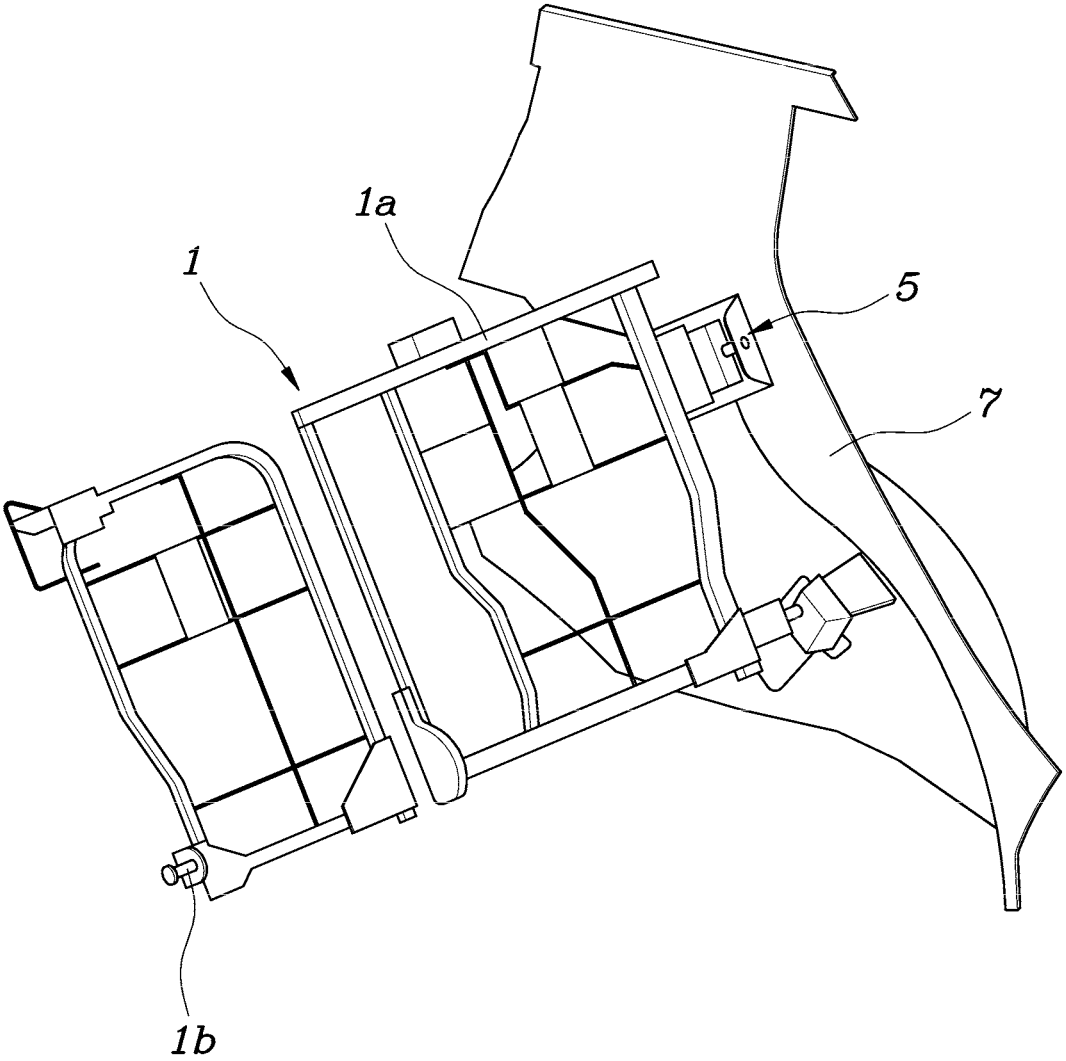
FIG. 1 is a diagram exemplifying an installation position of a reclining device according to the present disclosure.
Figure 2:
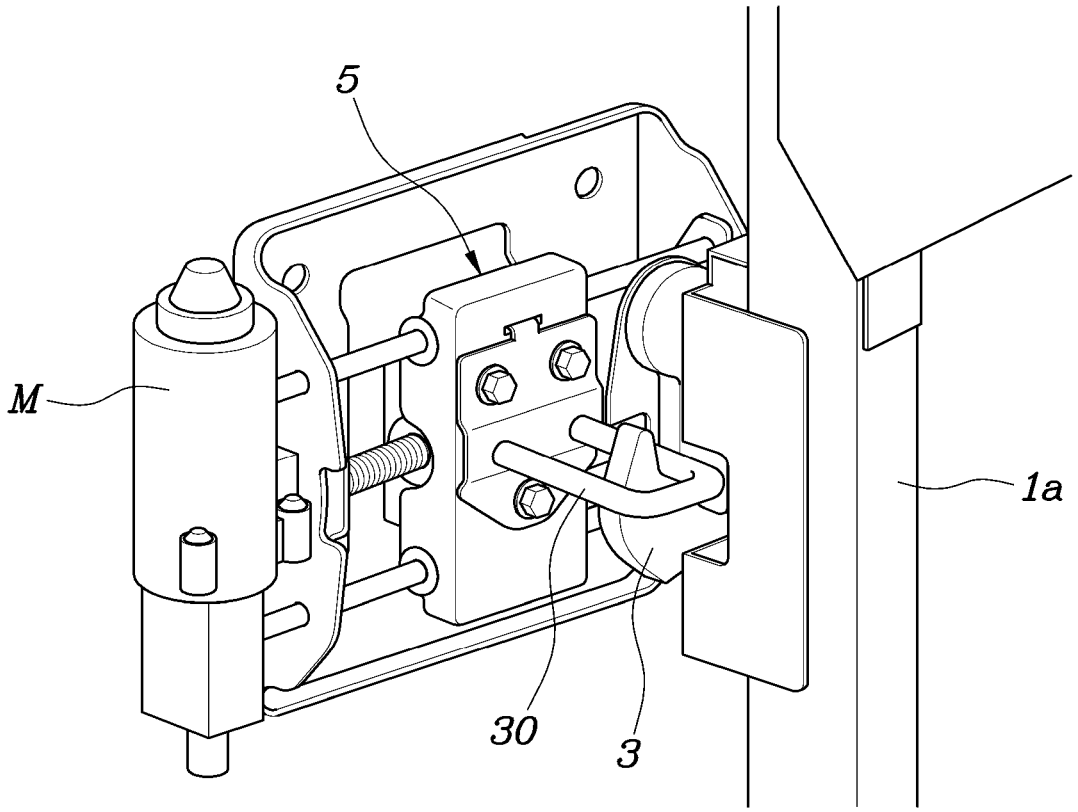
FIG. 2 is a diagram illustrating a state where a striker is combined with a latch according to the present disclosure.

FIG. 1 is a diagram exemplifying an installation position of a reclining device according to the present disclosure, and FIG. 2 is a diagram illustrating a state where a striker 30 is combined with a latch 3 according to the present disclosure.

Referring to the drawings, the present disclosure can be applied to a seatback 1 of a rear seat. A latch 3 combined with a side of a seatback frame 1a is rotated together with the seatback 1, and a striker 30 is provided on a rotation trajectory of the rotating latch 3. The striker 30 is installed inside a quarter panel of a vehicle body 7, and the latch 3 is combined with the striker 30.

For reference, the seat has a structure in which the seatback 1 is foldable based on a hinge shaft *1b* at a lower end of the seatback 1, and in folding and unfolding processes of the seatback 1, the latch 3 can be engaged with the striker 30.

In particular, according to the present disclosure, the striker 30 moves and is able to rotate the seatback 1 together with the latch 3, and the reclining device according to the present disclosure is configured to briefly include the latch 3 and a striker module 5.

Figure 3:
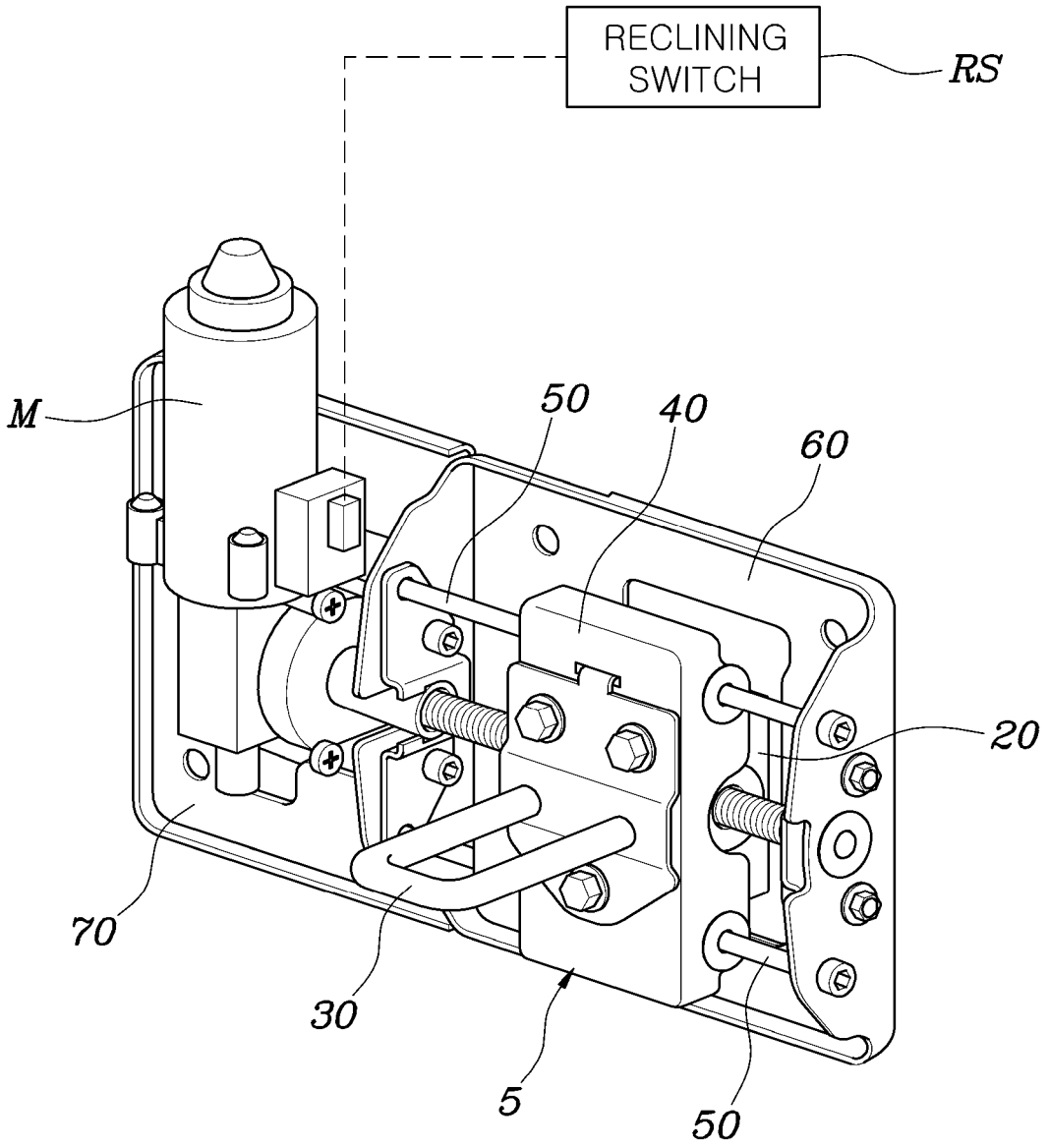
FIG. 3 is a diagram showing the structure and shape of a reclining device according to the present disclosure.

[Referring to FIG. 3, the] *The* reclining device is configured to include the latch 3 installed on the side of the seatback 1 and being rotated together with the seatback 1, and the striker module 5 in which the latch 3 is engaged with the striker 30 [installed in the vehicle body 7,]. [and] *The latch moves along a rotation trajectory as the seatback reclines, and* the striker [30] *module 5* moves [to draw a trajectory in a certain section] *the striker 30 along a striker trajectory* overlapping the rotation trajectory of the latch 3 in a state where the latch 3 is engaged [and reclines] *with the striker 30 such that movement of the striker 30 causes* the seatback 1 *to recline* together with the latch 3.

[For example, the] *The* striker 30 is [installed in a portion requiring fixing of an angle of the seatback 1 in the rotation trajectory of the latch 3, and the latch 3 is engaged with the striker 30 in the process in which the latch 3 is rotated together with the seatback 1] *a part of the striker module 5 mounted on the vehicle body.*

Further, since the striker module 5 including the striker 30 moves [in a straight line in a rotation trajectory section in which] *linearly during* a reclining operation of the seatback 1 [is required], the latch 3 combined with the striker 30 moves together with the striker 30, and thus the seatback 1 is reclined.

Figure 4:
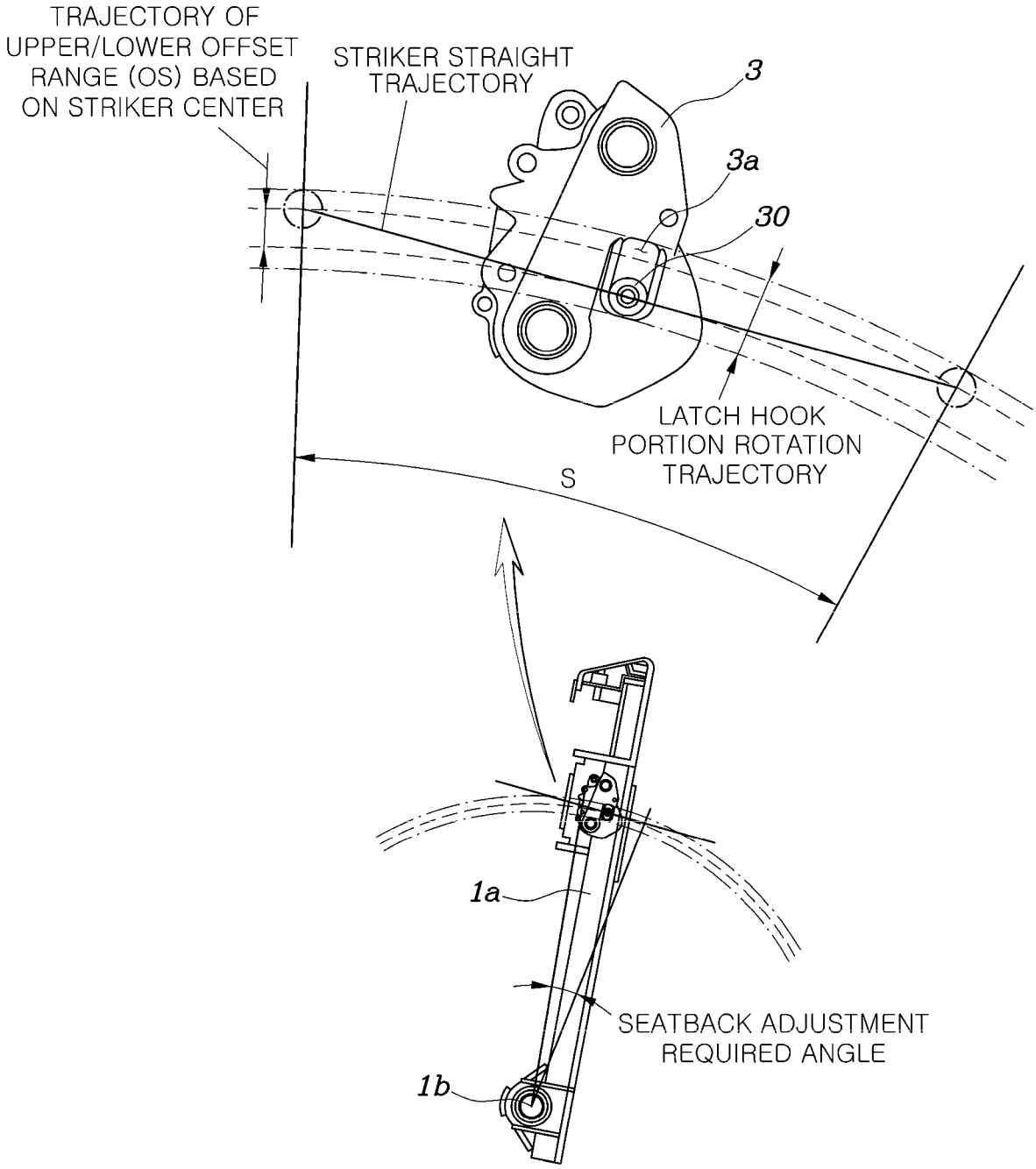
FIG. 4 is a diagram showing a section in which a rotation trajectory of a latch and a movement trajectory of a striker module overlap each other according to the present disclosure.

This will be described in detail through FIG. 4. [A] *The latch 3 comprises a* hook portion [3a, in which] *that engages* the striker 30 [is combined with] *to secure the striker 30 to* the latch 3. [, is formed, and the] *The* hook portion [3a is formed in the shape of] *defines* an elongated hole *3a* along a normal direction with respect to the rotation trajectory of the latch 3.

Accordingly, when the striker 30 moves, the *seatback 1 reclines together with the latch 3 within a* maximum angle range [of the seatback may be determined] *that is limited* by [configuring] an offset range OS [in] *within* which the striker 30 [is movable] *moves* along the [hook portion] *elongated hole* 3a [in a state where the movement] *as the striker module 5 moves the striker 30 along the striker* trajectory [of the striker 30 and] *overlapping* the rotation trajectory of the latch 3 [are simultaneously satisfied].

In this case, the offset range OS may be a distance in which the striker 30 is movable along a length direction of the [hook portion] *elongated hole* 3a [based on] *with respect to* a center portion of the striker 30, and the offset range OS may differ depending on designed values of the length of the [hook portion] *elongated hole* 3a and the distance in which the striker 30 can move in a straight line.

That is, the distance between a hinge shaft 1b at the lower end of the seatback 1 and the latch 3 is relatively long, and [in case of zooming in] *when looking closely at* the rotation trajectory of the latch 3, [although the latch 3 performs a rotation] *the rotational* motion[,] *of* the latch 3 appears to be [rotated close to] *nearly* a linear motion. [, and the] *The* hook portion [3a] of the latch 3, *which engages* [being combined with] the striker 30, [is formed long in the shape of an] *defines the* elongated hole *3a* along the normal direction with respect to the rotation trajectory of the latch 3.

Accordingly, if the striker 30 moves in a section S [in which the linear motion trajectory of the striker 30 and the rotation motion trajectory] *when the rotational motion* of the latch 3 [are simultaneously satisfied] *appears to be nearly a linear motion of the latch 3*, the striker 30 is guided to move upward or downward within the offset range OS of the [hook portion] *elongated hole* 3a, and thus the latch 3 [combined] *moves together* with the striker 30 [moves together].

Accordingly, since the latch 3 is pulled and moves together in the movement direction of the striker 30, the seatback 1 combined with the latch 3 moves together, and thus the seatback 1 can be steplessly reclined within the maximum reclining angle of the seatback 1 at which the linear motion trajectory of the striker 30 and the rotation motion trajectory of the latch 3 overlap each other.

Figure 5:
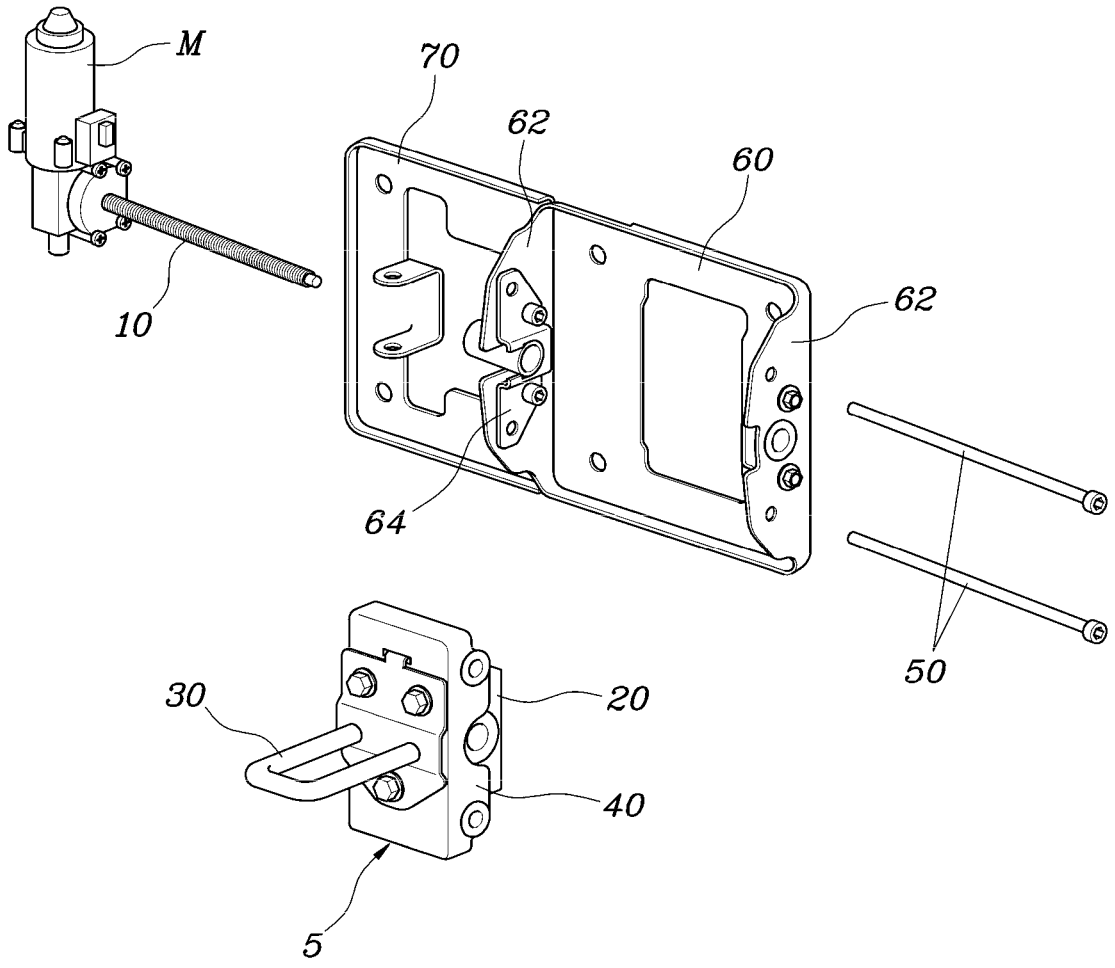
FIG. 5 is an exploded perspective view of main parts constituting a reclining device according to the present disclosure.
Figure 6:
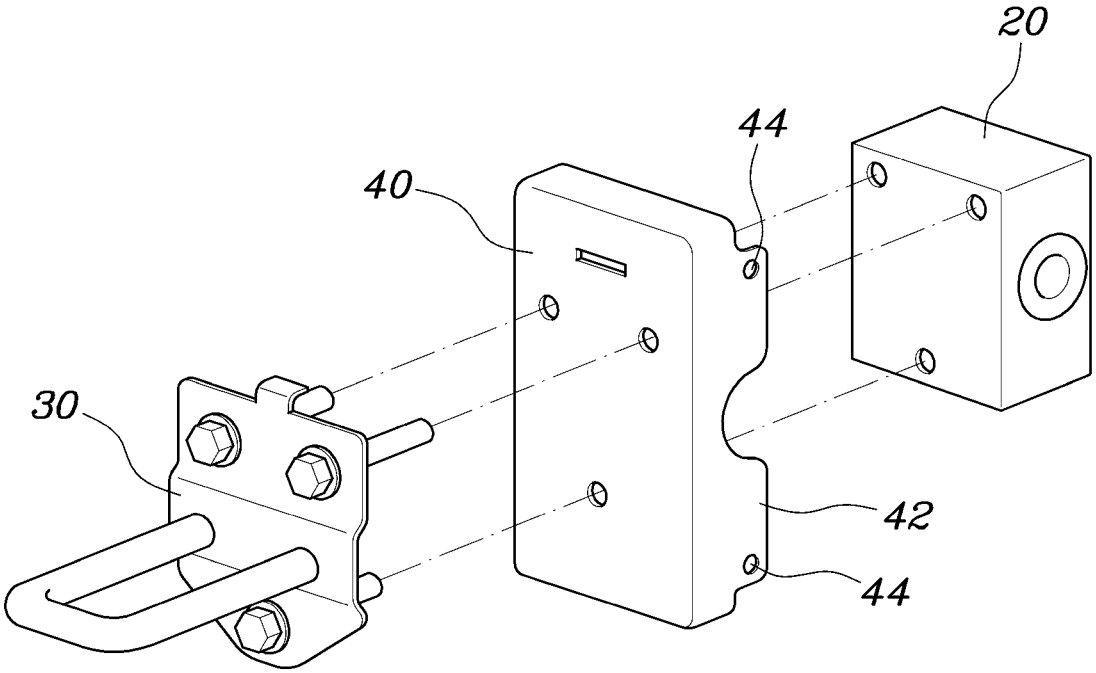
FIG. 6 is an exploded perspective view of a striker module according to the present disclosure.

Meanwhile, FIG. 5 is an exploded perspective view of main parts constituting a reclining device according to the present disclosure, and FIG. 6 is an exploded perspective view of a striker module 5 according to the present disclosure. The striker module 5 according to the present disclosure is configured to include a lead screw 10, a moving block 20, and the striker 30.

Referring [to the drawing] *FIGS. 5 and 6*, the configuration of the striker module 5 will be described. The striker module 5 is configured to include a lead screw 10 installed on the vehicle body 7 along a linear trajectory on which the striker 30 moves, *and* a moving block 20 [penetratingly combined] *penetrated by and in threaded engagement* with the lead screw 10 [in a screw structure and], *the moving block 20 being* configured to move in a straight line along the lead screw 10 [in a state where] *such that* a rotation motion of the lead screw 10 is converted into a linear motion[;] *of the moving block 20,* and the striker 30 *is* configured to move together with the moving block 20.

For example, the lead screw 10 is rotated in forward and reverse directions based on its axis, and inside the moving block 20, a hole having an inner periphery formed in a screw shape is formed to move in a straight line along the lead screw 10 when the lead screw 10 is rotated.

That is, in accordance with the rotation direction of the lead screw 10, the moving block 20 moves in a straight line toward one end or the other end of the lead screw 10, and thus the striker 30 combined with the moving block 20 moves together.

In addition, the reclining device according to the present disclosure is configured to include a guide bracket 40 [combined] *positioned* between the moving block 20 and the striker 30, and [a] guide [wire] *rods* 50 [combined with] *secured to* the vehicle body 7, [penetratingly provided in] *penetrating* the guide bracket 40 in a direction parallel to the lead screw 10, and configured to guide the straight movement of the moving block 20.

For example, bolting-engagement is performed in a state where the striker 30 is in surface contact with the front side of the guide bracket 40 and the moving block 20 is in surface contact with the rear side of the guide bracket 40.

Further, since the guide [wire] *rods* 50 [penetrates] *penetrate* the guide bracket 40 and [is combined with] *are coupled to* a module mounting bracket 60 [combined with] *on* the vehicle body 7, the striker module 5 may not be rotated, but *rather* may move in a straight line when the lead screw 10 is rotated.

[In addition, an extension part] *Extension parts* 42 [is formed at both] *extend from respective opposite* ends of the guide bracket 40 *and* in a direction orthogonal to the lead screw 10, [and a] *two* guide [hole] *holes* 44 [is] *are* formed [on] *in each of* the extension [part] *parts* 42, and the guide [wire] *rods* 50 [may be penetratingly provided therein] *penetrate the guide holes 44*.

That is, since the upper end and the lower end of the guide bracket 40 are formed to extend upward and downward, it is possible to secure [an area] *respective areas* in which the guide [wire] *rods* 50 [is penetratingly provided] *penetrate the guide bracket 40*.

Meanwhile, the reclining device according to the present disclosure may further include a motor M configured to provide a rotational driving force to the lead screw 10.

For example, the end part of the lead screw 10 may be [combined with] *coupled to* the shaft of the motor M, and the lead screw 10 may be rotated in accordance with the rotation of the motor M.

In addition, a reclining switch RS may be provided in a vehicle compartment, and the motor M may be rotated in a forward or reverse direction in accordance with an operation of the reclining switch RS.

For example, the reclining switch RS may be mounted on a vehicle door portion or a side trim, and a passenger may operate the reclining switch RS to lay down or set up the angle of the seatback 1.

That is, since the striker module 5 moves by the driving force of the motor M, it is possible to adjust the angle of the seatback 1 only by the operation of the reclining switch RS.

Accordingly, more luxurious and comfortable usability is provided in adjusting the angle of the seatback 1, and the cost and the weight of the reclining device can be reduced through structure simplification as compared with the existing reclining mechanism.

Figure 7:
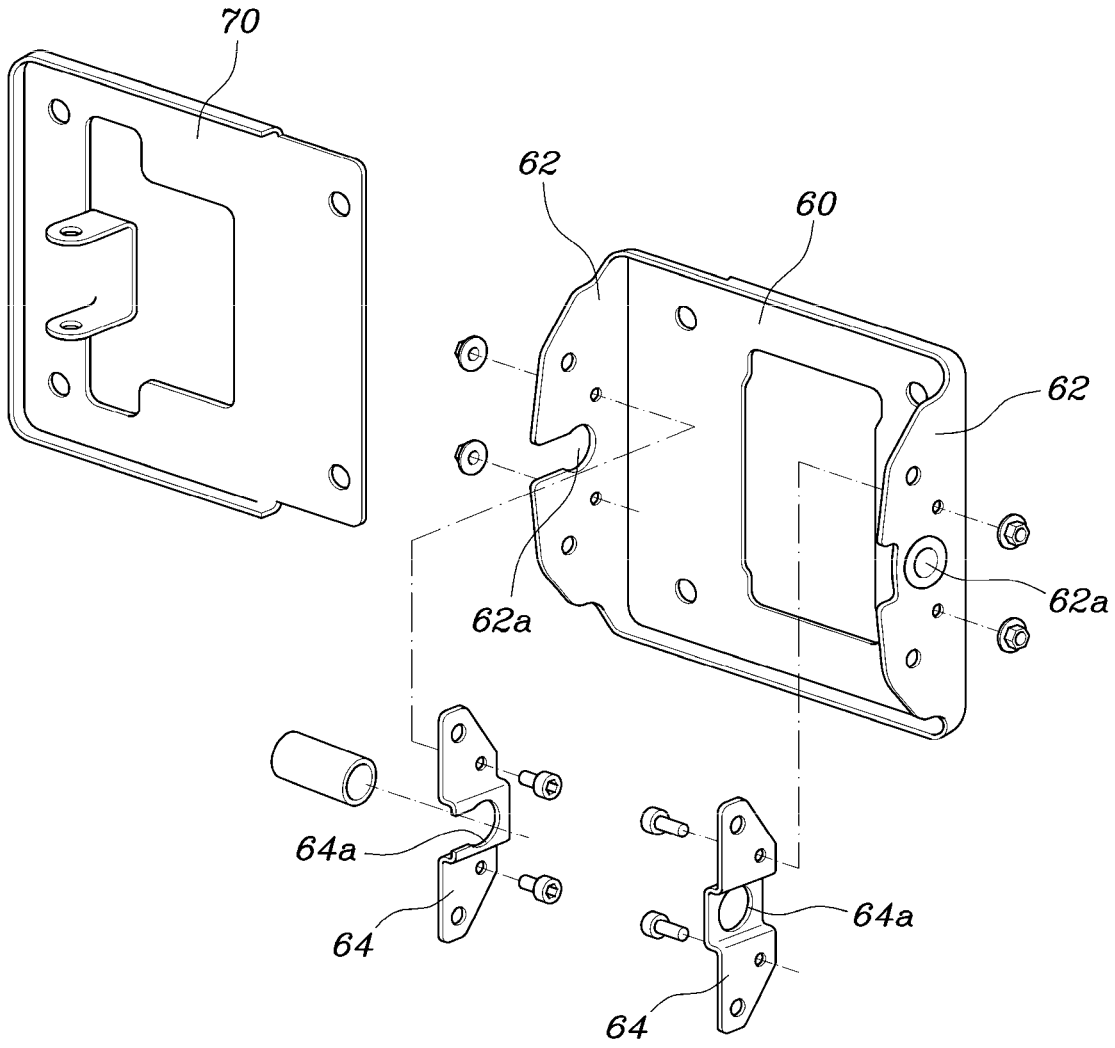
FIG. 7 is an exploded perspective view of a module mounting bracket and a motor mounting bracket according to the present disclosure.

Meanwhile, FIG. 7 is an exploded perspective view of a module mounting bracket 60 and a motor mounting bracket 70 according to the present disclosure.

Referring to [the drawing] *FIG. 7*, the module mounting bracket 60 is [combined with] *secured to* the vehicle body 7, [a] *bent* support [part] *parts* 62 [is formed to be bent at both] *extend from respective opposite* ends of the module mounting bracket 60 [toward] *and in a same direction as* the striker 30, *each of the support parts 62 has* a *respective* sub bracket 64 [is combined with the support part 62] *secured thereto*, a main support hole 62a *is formed in each of the support parts 62* and a sub support hole 64a [are coaxially] *is* formed [on the support part 62 and] *in each of* the sub [bracket] *brackets* 64, [respectively,] the main support hole 62a [and the sub support hole 64a] *in each of the support parts 62 being coaxial with and* being [formed to be] spaced apart from [each other] *the sub support hole 64a in the respective sub bracket 64*, and the lead screw 10 may [be inserted into] *extend through* and *be* supported by *each of* the main support [hole] *holes* 62a and the sub support [hole] *holes* 64a.

For example, a middle portion of the module mounting bracket 60 being mounted on the vehicle body 7 is formed in the shape of a rectangular plate, and [the] *each* support part 62 [is formed to extend] *extends outwardly* from [the middle portion of] the module mounting bracket 60 [in a vertical direction].

Further, the upper end and the lower end of [the] *each* sub bracket 64 [are] *is* mounted inside the *respective* support part 62, [and the] *each* main support hole 62a is formed at a middle [end] of the *respective* support part 62, and [the] *each* sub support hole 64a is formed at a middle [end] of the *respective* sub bracket 64.

In this case, since the cross section of the middle [end] portion of [the] *each* sub bracket 64 is formed in a "U" shape, a structure is provided, in which [the] *each* main support hole 62a and the *respective* sub support hole 64a are formed to be spaced apart from each other.

Accordingly, since the lead screw 10 is inserted into and supported by the main support hole 62a and the sub support hole 64a, respectively, the number of support points of the lead screw 10 is increased, and thus the lead screw 10 can be supported more stably as well as the straightness of the lead screw 10 can be improved.

For reference, [both ends] *one end* of *each of* the guide [wire] *rods* 50 [are] also [penetratingly mounted on] *penetrates* the sub [bracket] *brackets* 64 and *a respective one of* the support [part] *parts* 62, *and an opposite end of each of the guide rods 50 penetrates the other one of the support parts 62*.

Continually, [as shown in FIG. 7,] according to the present disclosure, [a bracket on which] the striker module 5 *may be mounted on a module mounting bracket 60* and the motor M [are] *may be* mounted [may be individually configured] *on a motor mounting bracket 70*.

[Referring to the drawing, a] *A* motor mounting bracket 70 is [combined with] *secured to* the vehicle body 7 and the motor M is mounted thereon, an end part of the motor mounting bracket 70 and an end part of the module mounting bracket 60 are provided to overlap each other, and border portions and overlapping portions of the motor mounting bracket 70 and the module mounting bracket 60 may be [bolting-combined with] *bolted to* the vehicle body 7.

For example, not only the module mounting bracket 60 but also the motor mounting bracket 70 is formed in the shape of a rectangular plate, and the module mounting bracket 60 and the motor mounting bracket 70 are formed to have the same upper and lower lengths.

Further, in a state where a part of the motor mounting bracket 70 overlaps the rear side of the module mounting bracket 60, the above brackets are assembled to the vehicle body 7 through 6-point bolting.

That is, since the motor mounting bracket 70 and the module mounting bracket 60 are mounted on the vehicle body 7 in a state where they overlap each other, the combination stiffness of the *module* mounting bracket *60 and the motor mounting bracket 70* is increased, and thus the combination stiffness of the motor M and the striker module 5 being mounted on the motor mounting bracket 70 and the module mounting bracket 60 can also be increased.

Figure 8A:
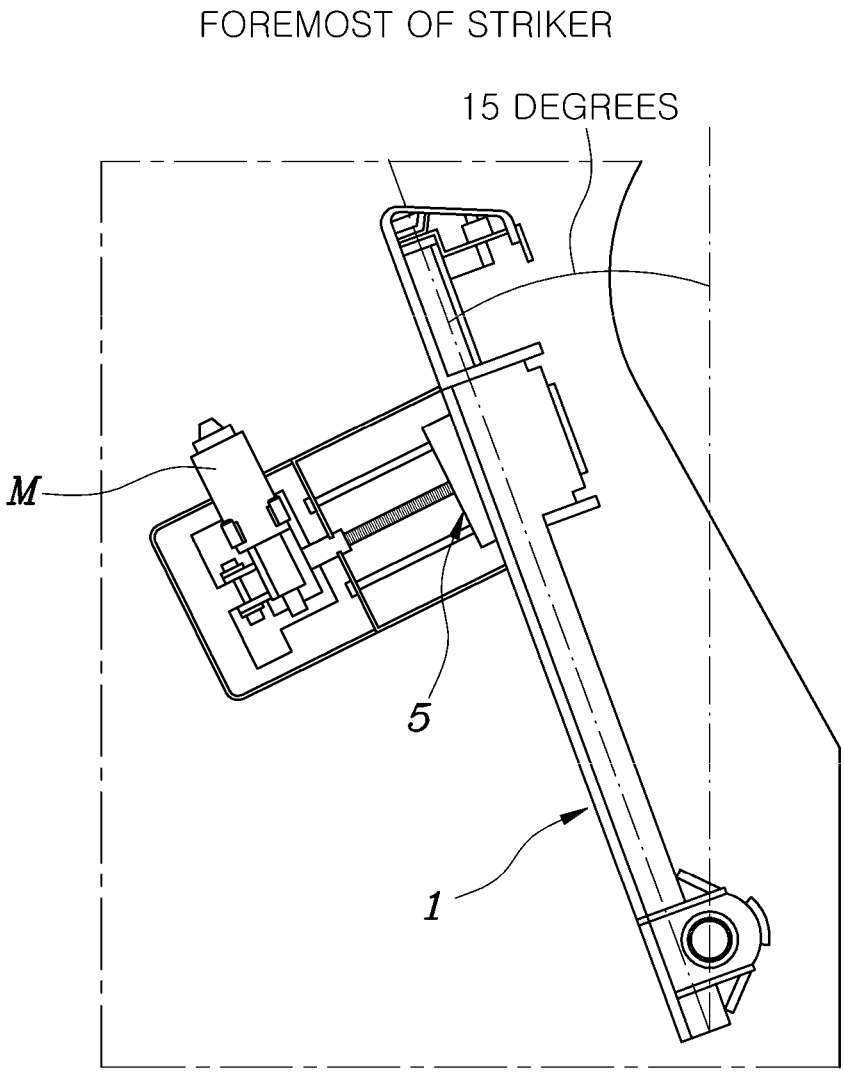
FIGS. 8A, 8B, and 8C are diagrams exemplifying an adjustment of a seatback angle in accordance with movement of a striker module according to the present disclosure.
Figure 8B:
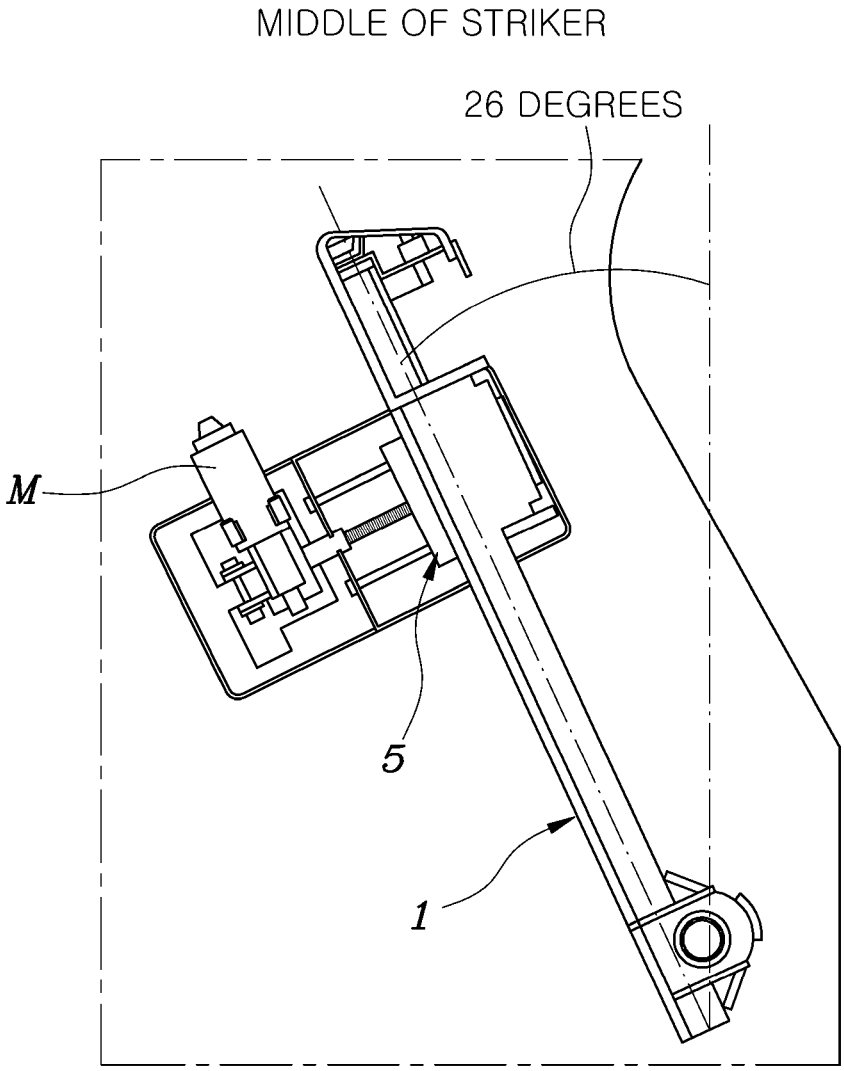
Figure 8C:
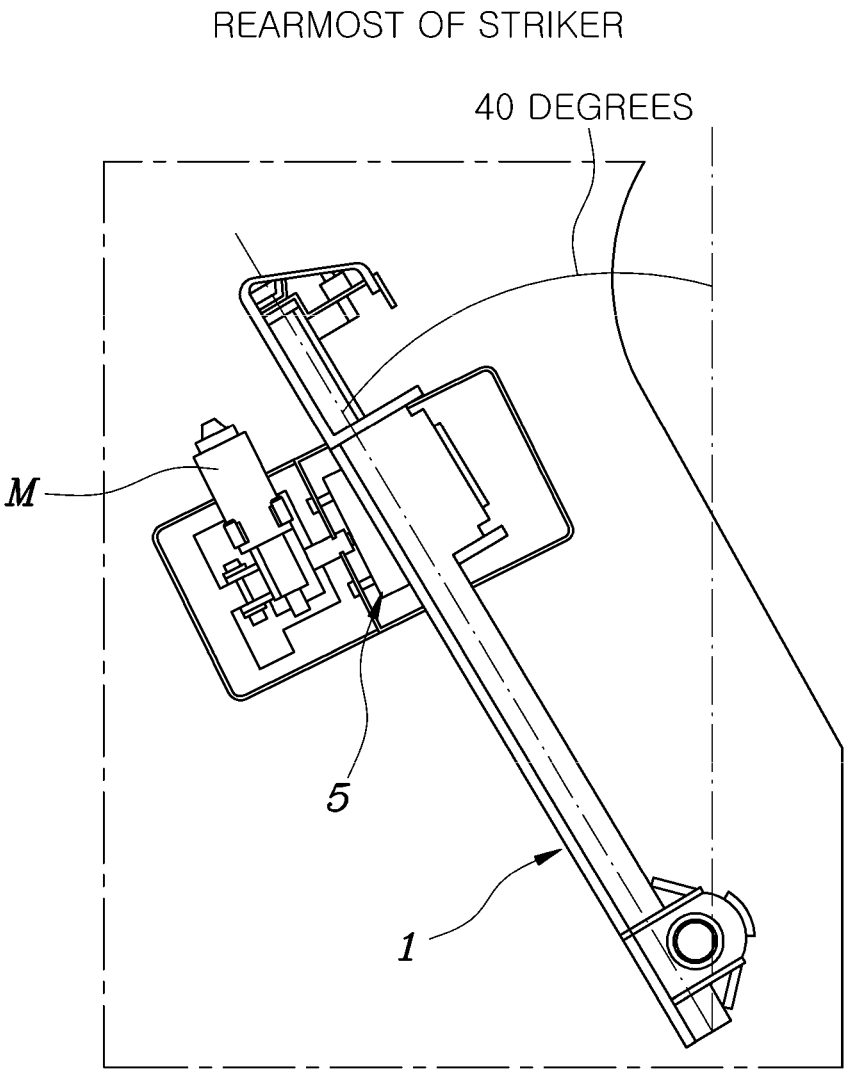

Meanwhile, FIGS. 8A to 8C are diagrams exemplifying an adjustment of an angle of a seatback 1 in accordance with movement of a striker module 5 according to the present disclosure.

For example, the maximum angle range of the seatback may be set to 10° to 50°.

Referring to the drawings, by moving the striker 30 back and forth of the lead screw 10 through the operation of the motor M, the latch 3 combined with the striker 30 moves together, and thus the angle of the seatback 1 can be adjusted.

That is, FIG. 8A shows a state where the striker 30 moves to the foremost position of the lead screw 10 through the operation of the motor M. In this state, the seatback 1 [maximally sets up within the reclining operation range of the seatback 1] *is reclined*, and in this case, the angle of the seatback 1 is at the level of 15°.

Further, FIG. 8B shows a state where the striker 30 moves to the middle position of the lead screw 10 through the operation of the motor M. In this state, the seatback 1 is positioned at a middle angle within the reclining operation range of the seatback 1, and in this case, the angle of the seatback 1 is at the level of 26°.

Further, FIG. 8C shows a state where the striker 30 moves to the rearmost position of the lead screw 10 through the operation of the motor M. In this state, the seatback 1 [maximally lies down within the reclining operation range of the seatback 1] *is fully reclined*, and [in this case,] the angle of the seatback 1 is at the level of 40°.

As described above, according to the present disclosure, since the striker 30 moves in accordance with the operation of the motor M and the latch 3 is pulled to move in the movement direction of the striker 30, the seatback 1 combined with the latch 3 moves together, and thus it is possible to recline the seatback 1 at stepless angles.

Although specific embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

The invention claimed is:

1. A reclining device for a seat, comprising:

a latch installed on a side of a seatback; and a striker module [in which the latch is engaged with] *having* a striker *and being* installed in a vehicle body, *wherein the striker is engaged by the latch*;

wherein the *latch moves along a rotation trajectory as the seatback reclines, and the* striker *module* moves [in a certain section] *the striker along a striker trajectory* overlapping [a] *the* rotation trajectory of the latch in a state where the latch is engaged[, and wherein] *with the striker such that movement of* the striker [reclines] *causes* the seatback *to recline* together with the latch;

wherein the striker module comprises:

a lead screw installed on the vehicle body along [a] *the striker* trajectory on which the striker moves;

a moving block [penetrating] *penetrated by and in threaded engagement with* the lead screw [in a screw structure], the moving block being configured to move in a straight line along the lead screw [in a state where] *such that* a rotation motion of the lead screw is converted into a linear motion *of the moving block*; and

*a guide bracket positioned between the moving block and the striker;* wherein the striker is configured to move together with the moving block; [and]

*a guide rod secured to the vehicle body, the guide rod penetrating the guide bracket in a direction parallel to the lead screw, and being configured to guide the straight movement of the moving block; and*

*a motor configured to provide a rotational driving force to the lead screw.*

[wherein the reclining device further comprises a lead screw installed on the vehicle body along a trajectory on which the striker moves;]

[a moving block penetrating the lead screw in a screw structure, the moving block being configured to move in a straight line along the lead screw in a state where a rotation motion of the lead screw is converted into a linear motion; and]

[wherein the striker is configured to move together with the moving block.]

2. The reclining device according to claim 1, wherein [an] extension [part is formed at both] *parts extend from respective opposite* ends of the guide bracket *and* in a direction orthogonal to the lead screw; and wherein a guide hole is formed on *each of* the extension [part] *parts*, and the guide [wire] *rod* penetrates the guide [hole] *holes*.

[3. The reclining device according to claim 1, further comprising a motor configured to provide a rotational driving force to the lead screw.]

4. The reclining device according to claim [3]*1*, wherein a reclining switch is provided in a vehicle compartment; and wherein the motor is rotated in a forward or reverse direction upon operation of the reclining switch.

5. The reclining device according to claim [3]*1*, wherein a module mounting bracket is secured to the vehicle body;

[a] *bent* support [part is bent at both] *parts extend from respective opposite* ends of the module mounting bracket [toward] *and in a same direction as* the striker;

*each of the support parts has* a *respective* sub bracket [is] secured [to the support part] *thereto*;

a main support hole *is formed in each of the support parts* and a sub support hole [are coaxially] *is* formed [on the support part and] *in each of* the sub [bracket respectively,] *brackets*, the main support hole [and the sub support hole] *in each of the support parts being coaxial with and* being spaced apart from [each other] *the sub support hole in the respective sub bracket*; and the lead screw [is inserted into and supported by] *extends through each of* the main support [hole] *holes* and the sub support [hole] *holes*.

6. The reclining device according to claim 5, wherein a motor mounting bracket is secured to the vehicle body and the motor is mounted thereon;

an end part of the motor mounting bracket and an end part of the module mounting bracket overlap each other; and border portions and overlapping portions of the motor mounting bracket and the module mounting bracket are bolted to the vehicle body.

7. The reclining device according to claim 1, wherein *the latch comprises* a hook portion [in which] *that engages* the striker [is secured] *to secure the striker* to the latch [is formed];

the hook portion [is formed in a shape of] *defines* an elongated hole along a normal direction with respect to the rotation trajectory of the latch; and

*the seatback reclines together with the latch within* a maximum angle range [of the seatback] *that* is [determined] *limited* by [configuring] an offset range [in] *within* which the striker [is movable] *moves* along the [hook portion in a state where the movement] *elongated hole as the striker module moves the striker along the striker* trajectory [of the striker and] *overlapping* the rotation trajectory of the latch [are simultaneously satisfied].

8. The reclining device according to claim 7, wherein the maximum angle range [of the seatback] is 10° to 50°.

* * * * *